United States Patent
Huff et al.

(10) Patent No.: US 11,498,376 B2
(45) Date of Patent: Nov. 15, 2022

(54) LOCKING TRAILER BALL ASSEMBLY

(71) Applicants: Richard Huff, Watford City, ND (US);
Kristy Moore, Watford City, ND (US);
Wynell Welch, Watford City, ND (US)

(72) Inventors: Richard Huff, Watford City, ND (US);
Kristy Moore, Watford City, ND (US);
Wynell Welch, Watford City, ND (US)

( * ) Notice: Subject to any disclaimer, the term of this patent is extended or adjusted under 35 U.S.C. 154(b) by 522 days.

(21) Appl. No.: 16/395,214

(22) Filed: Apr. 25, 2019

(65) Prior Publication Data
US 2020/0338940 A1    Oct. 29, 2020

(51) Int. Cl.
*B60D 1/60* (2006.01)
*B60D 1/62* (2006.01)

(52) U.S. Cl.
CPC ..... *B60D 1/60* (2013.01); *B60D 1/62* (2013.01)

(58) Field of Classification Search
CPC ................................. B60D 1/60; B60D 1/62
USPC ............................................... 280/507
See application file for complete search history.

(56) References Cited

U.S. PATENT DOCUMENTS

| | | | | |
|---|---|---|---|---|
| 3,139,291 A * | 6/1964 | Geresy | ............... | B60D 1/065 |
| | | | | 280/507 |
| 3,810,664 A * | 5/1974 | Nunnink, Jr. | ............ | B60D 1/60 |
| | | | | 280/507 |
| 5,511,814 A * | 4/1996 | Floyd | .................. | B60D 1/065 |
| | | | | 280/507 |
| 2011/0088437 A1* | 4/2011 | Cline | ............... | B62D 53/061 |
| | | | | 70/258 |
| 2017/0326930 A1* | 11/2017 | Huff | .................... | B60D 1/60 |

FOREIGN PATENT DOCUMENTS

| | | | | |
|---|---|---|---|---|
| AU | 2002100367 | * 11/2003 | ............... | B60D 1/60 |
| AU | WO-3095275 | * 11/2003 | ............... | B60D 1/60 |
| DE | 1238782 | * 7/1963 | ............... | B60D 1/60 |
| GB | 2094250 | * 2/1981 | ............... | B60D 1/60 |
| GB | 2105275 | * 9/1981 | ............... | B60D 1/60 |
| GB | 2248430 | * 10/1990 | ............... | B60D 1/60 |

* cited by examiner

*Primary Examiner* — Tony H Winner
*Assistant Examiner* — Michael R Stabley
(74) *Attorney, Agent, or Firm* — Eugene Vamos

(57) ABSTRACT

A trailer coupler locking device that includes: a trailer ball body, wherein the trailer ball body is shaped as a coupling ball; a plurality of locking rods, where the plurality of locking rods define elongated members which extend from the trailer ball body; and a locking mechanism. The elongated members may be placed in either a locked position or an unlocked position. When in the unlocked position, the ball body moves freely in and out of a ball mount coupler, and when in a locked position, the ball body is locked into a ball mount coupler. The locking rods selectively extend and retract by manual operation of the locking mechanism, where the locking mechanism includes a cylinder lock that is operably connected to a rotational member and a mechanical rod actuator. The mechanical rod actuator operable connects the rotational member with each locking rod and enables each locking rod to move linearly in response to the rotary motion of the rotational member.

6 Claims, 4 Drawing Sheets

LOCKING TRAILER BALL ASSEMBLY

CROSS REFERENCE TO OTHER APPLICATIONS

This application claims priority to U.S. patent application Ser. No. 15/585,284 filed on May 3, 2017.

BACKGROUND OF THE INVENTION

Field of the Invention

The present invention relates generally to security devices and, more particularly, to a locking trailer ball which may be secured to a trailer coupler to prevent the trailer coupler from being detached from a trailer hitch.

Description of the Prior Art

The use and design of trailer hitch assemblies to allow for the attachment of trailers to a towing vehicle to be transported is well established. Generally, a trailer will include a trailer coupler which can attach to a trailer ball of a trailer hitch on a motor vehicle in order to be towed by the motor vehicle. It is understood however, that once the trailer is brought to an intended destination, it is common for the trailer to be detached from the motor vehicle until it is desired to move the trailer again. While the trailer coupler is disconnected, however, a problem which still exists is that the trailer may become a target for theft if an individual can simply attach the trailer coupler to a trailer ball on a trailer hitch mounted to another motor vehicle and just drive away. Thus, there remains a need for a locking device which may be secured to the trailer coupler when it is not connected to a vehicle hitch trailer ball. It would be helpful if such a trailer coupler locking device operated to prevent the trailer coupler to which it was attached from being attached to a vehicle hitch trailer ball until removed from the trailer coupler. It would be additionally desirable for such a trailer coupler locking device to utilize a plurality of key operated rods which prevented it from being removed while in a locked position.

It is therefore an object of the present invention to provide a locking trailer ball adapted to allow a user to secure the trailer coupler of a trailer. The primary components of the present invention include a trailer ball body, locking rods, and a locking mechanism. When in operation, the trailer coupler locking device enables a user to selectively prevent a trailer coupler from being attached to a vehicle's hitch ball. As a result, many of the limitations imposed by prior art structures are removed.

SUMMARY OF THE INVENTION

The present invention relates to a trailer coupler locking device that includes: a trailer ball body, wherein the trailer ball body is shaped as a coupling ball; a plurality of locking rods, where the plurality of locking rods define elongated members which extend from the trailer ball body; and a locking mechanism. The elongated members may be placed in either a locked position or an unlocked position. When in the unlocked position, the ball body moves freely in and out of a ball mount coupler, and when in a locked position, the ball body is locked into a ball mount coupler. The locking rods selectively extend and retract by manual operation of the locking mechanism, where the locking mechanism includes a cylinder lock that is operably connected to a rotational member and a mechanical rod actuator. The mechanical rod actuator operable connects the rotational member with each locking rod and enables each locking rod to move linearly in response to the rotary motion of the rotational member.

DETAILED DESCRIPTION OF THE INVENTION

The present invention relates to a locking trailer ball assembly that includes a series of components that enable the extension of locking pins from the outer perimeter of a trailer ball. The locking trailer ball assembly can lock a trailer into place once it is engaged with the ball assembly. This prevents theft of the trailer and secures the trailer onto the locking ball to prevent theft thereof. A key and rotating locking cylinder is used to lock the trailer ball into place.

Figure 1:
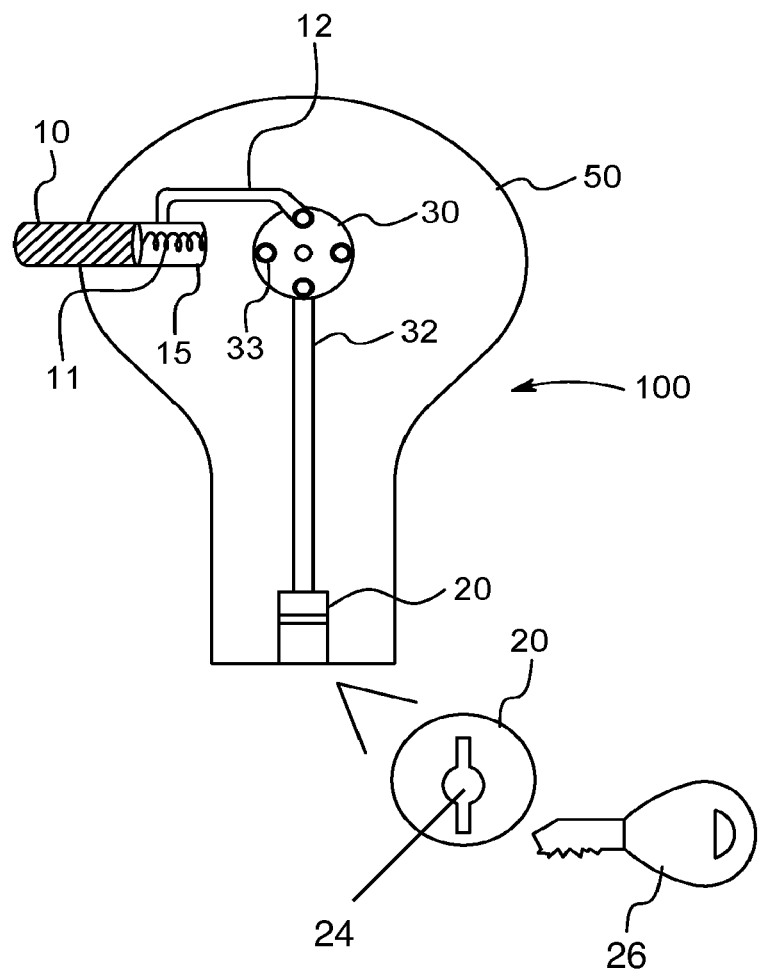
FIG. 1 depicts a side elevational view of a locking trailer ball assembly built in accordance with the present invention.

FIG. 1 depicts a side sectional view of the locking trailer ball assembly 100. The locking ball assembly 100 includes a ball 50 that has a locking pin 10 extending from a pin cavity 15. The ball 50 is shown with just one pin extending from the interior, however multiple pins may be arranged around the perimeter of the locking ball 50 to provide further security of the trailer ball assembly 100. As shown on a proximal end of the locking pin 10 is a spring 11 that expands and contracts within the pin cavity 15.

A pushrod 12 connects to the locking pin 10 to move the locking pin 10 from an extended to a retracted position based on the turning and movement of a rotating disc 30. One end of the pushrod 12 is attached to an opening of the rotating disc 30 and the opposing or distal end is attached to the locking pin 10. The rotating disc 30 rotates based on movement of control rod 32 that is attached to a locking cylinder 20. Openings 33 are provided along the perimeter of the rotating disc 30 to provide for the insertion of further locking pins 10 along the perimeter of the ball 50. Below the ball assembly 100 is a view of the locking cylinder 20 with a keyhole 24 and a key 26 that is used to turn the locking cylinder 20.

Figure 2:
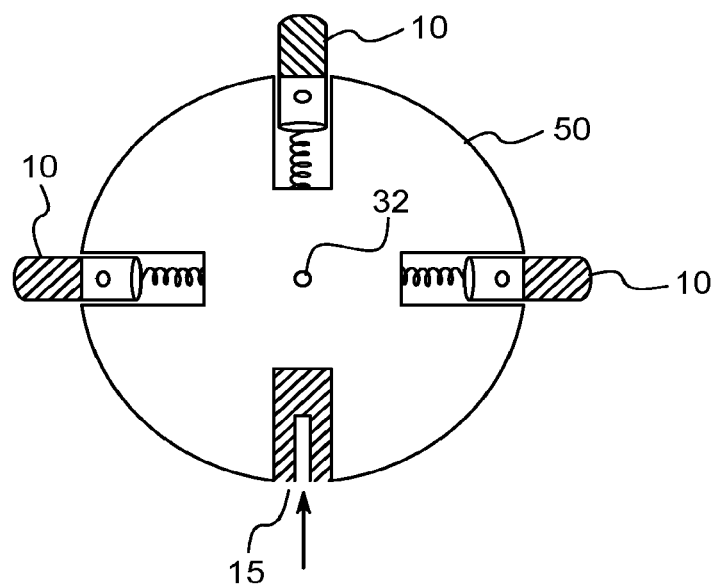
FIG. 2 depicts a top sectional view of the internal component of the present invention.

A series of locking pins is shown in FIG. 2 through a top sectional view. The locking pin 10 is shown extending from pin cavities in three positions and an opened cavity is shown showing the internal portions of the pin cavity 15. This view is provided to show the position of the locking pin 10 through pin cavities 15 around the perimeter of the ball 50. A spring 11 is attached to each locking pin 10 and a guide 13 is provided on each locking pin for the attachment of the pushrod 12.

Figure 3:
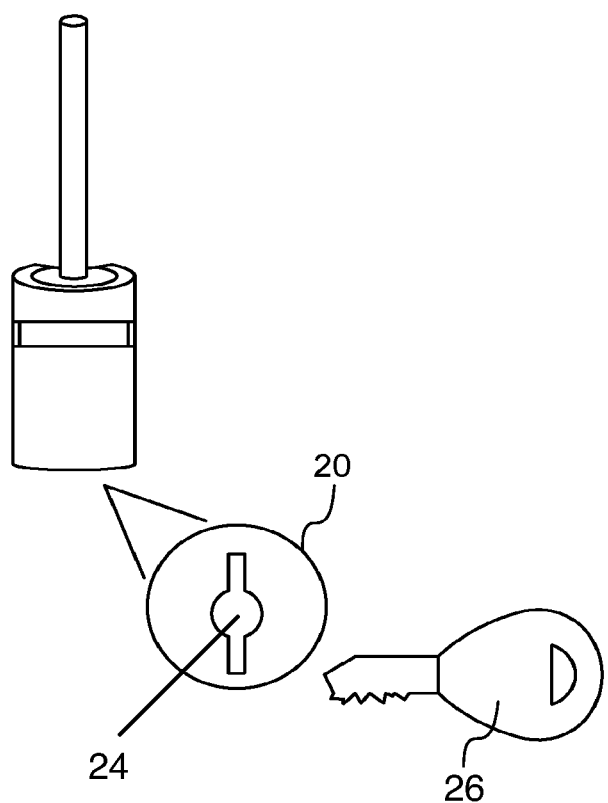
FIG. 3 depicts components of the locking trailer ball assembly.
Figure 4:
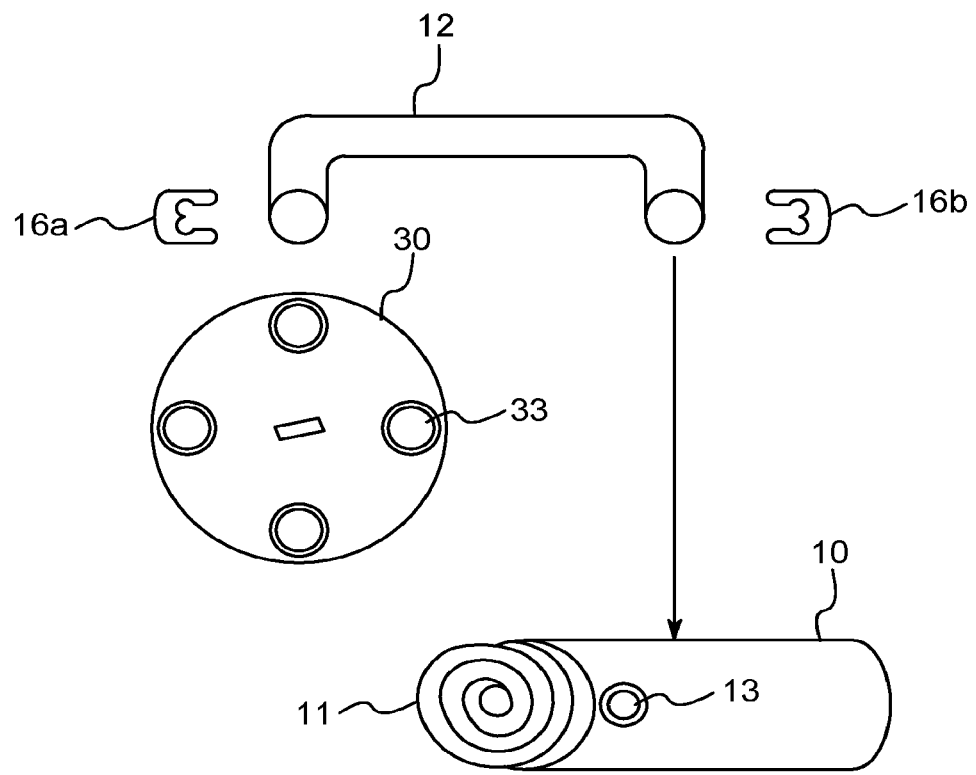
FIG. 4 shows a further detail of a rotating disc and pushrod of the present invention.

FIG. 3 shows a view of the locking cylinder 20 and an extending control rod 32. This control rod 32 attaches to the rotating disc 30 within the ball 50. FIG. 4 shows further detail of the rotating disc 30 and pushrod 12. Pushrod 12 attaches to one of the openings 33 along the rotating disc 30 and is held in place with a clip 16*a*. The opposing end of pushrod 12 is attached to locking pin 10 onto the guide 13 with a clip 16*b*. These components are all shown as attached in FIG. 1 and the movement of the rotating disc 30 for the transfer of a locking pin 10 through a respective pin cavity 15. When fully assembled this device locks a trailer onto the ball 50 and secures the trailer to prevent removal of the trailer or theft of the trailer without releasing the lock 20.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The exemplary embodiment was chosen and described in order to best explain the principles of the invention and its practical application, to thereby enable others skilled in the art to best utilize the invention and various embodiments with various modifications as are suited to the particular use contemplated.

What is claimed is:

1. A locking trailer ball assembly that secures to a trailer coupler to prevent the trailer coupler from being attached to a vehicle hitch trailer ball until the locking trailer ball assembly is removed from the trailer coupler, the locking trailer ball assembly comprising:
   (a) a ball; the ball comprising:
      (i) one or more pin cavities;
   (b) a locking pin, a spring, and a push rod for each of the corresponding pin cavities;
      (i) the locking pin comprising: a proximal end;
      (ii) the push rod comprising: a rotating disc end and an opposing end;
      (iii) where the spring is connected to the proximal end of the locking pin and the ball, and
      (iv) where the opposing end of each push rod is attached to the corresponding locking pin,
   (c) a control rod; the control rod comprising:
      (i) a rotating disc end; and
      (ii) a distal end;
   (d) a rotating disc; the rotating disc comprising:
      (i) a perimeter;
      (ii) a push rod opening for each push rod, where the rotating disc end of each push rod attaches to the corresponding push rod opening of the rotating disc;
      (iii) a control rod opening for the control rod, where the rotating disc end of the control rod attaches to the corresponding control rod opening of the rotating disc; and
      (iv) where each push rod opening and the control rod opening are provided along the perimeter of the rotating disc;
   (e) a locking cylinder; the locking cylinder comprising:
      (i) a keyhole;
      (ii) where the distal end of the control rod is attached to the locking cylinder,
   (f) where each locking pin lies within the corresponding pin cavity,
   (g) where the turn of the locking cylinder moves the control rod,
   (h) where the rotating disc rotates based on the movement of the control rod,
   (i) where the rotation of the rotating disc moves each push rod, which in turn extends and retracts each locking pin from the corresponding pin cavities, and
   (j) where the rotating disc, the control rod, each push rod, and each spring are disposed within the ball.

2. The locking trailer ball assembly described in claim 1,
   (a) the trailer ball assembly further comprising:
      (i) a key;
      (ii) where the key is used to turn the locking cylinder by introducing the key into the keyhole.

3. The locking trailer ball assembly described in claim 1,
   (a) wherein the ball further comprising:
      (i) a perimeter; and
      (ii) where the one or more pin cavities are arranged on the perimeter of the ball.

4. The locking trailer ball assembly described in claim 1, the locking trailer ball assembly further comprising:
   (a) a push rod clip and a locking pin clip for each push rod;
   (b) wherein each locking pin further comprising a guide;
   (c) where each push rod is held in place to the guide of the corresponding locking pin by the corresponding push rod clip, and
   (d) where each push rod is held in place to the corresponding push rod opening by the corresponding push rod clip.

5. The locking trailer ball assembly described in claim 4,
   (a) the trailer ball assembly further comprising:
      (i) a key;
      (ii) where the key is used to turn the locking cylinder by introducing the key into the keyhole.

6. The locking trailer ball assembly described in claim 4,
   (a) wherein the ball further comprising:
      (i) a perimeter; and
      (ii) where the one or more pin cavities are arranged on the perimeter of the ball.

* * * * *